UNITED STATES PATENT OFFICE.

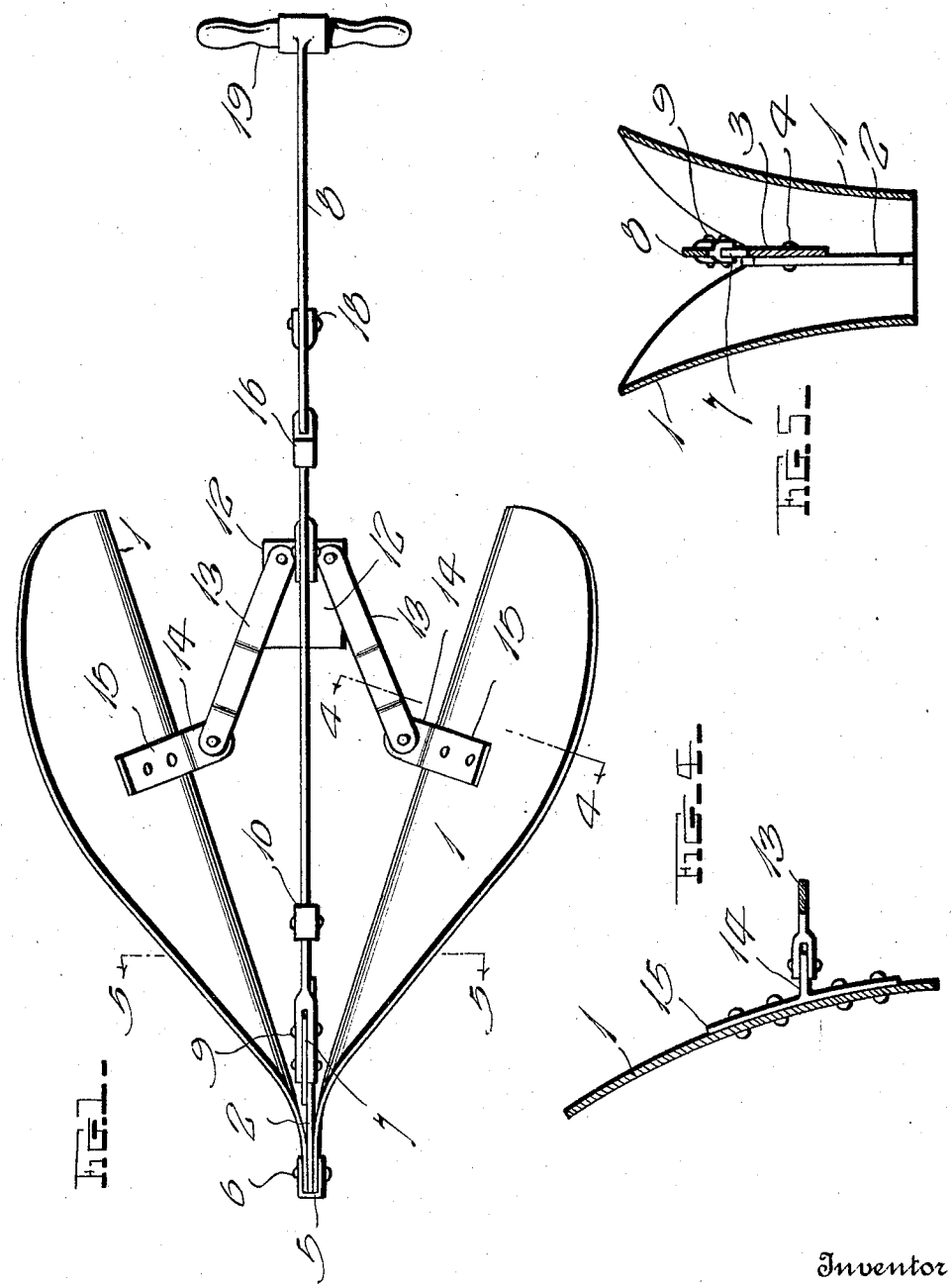

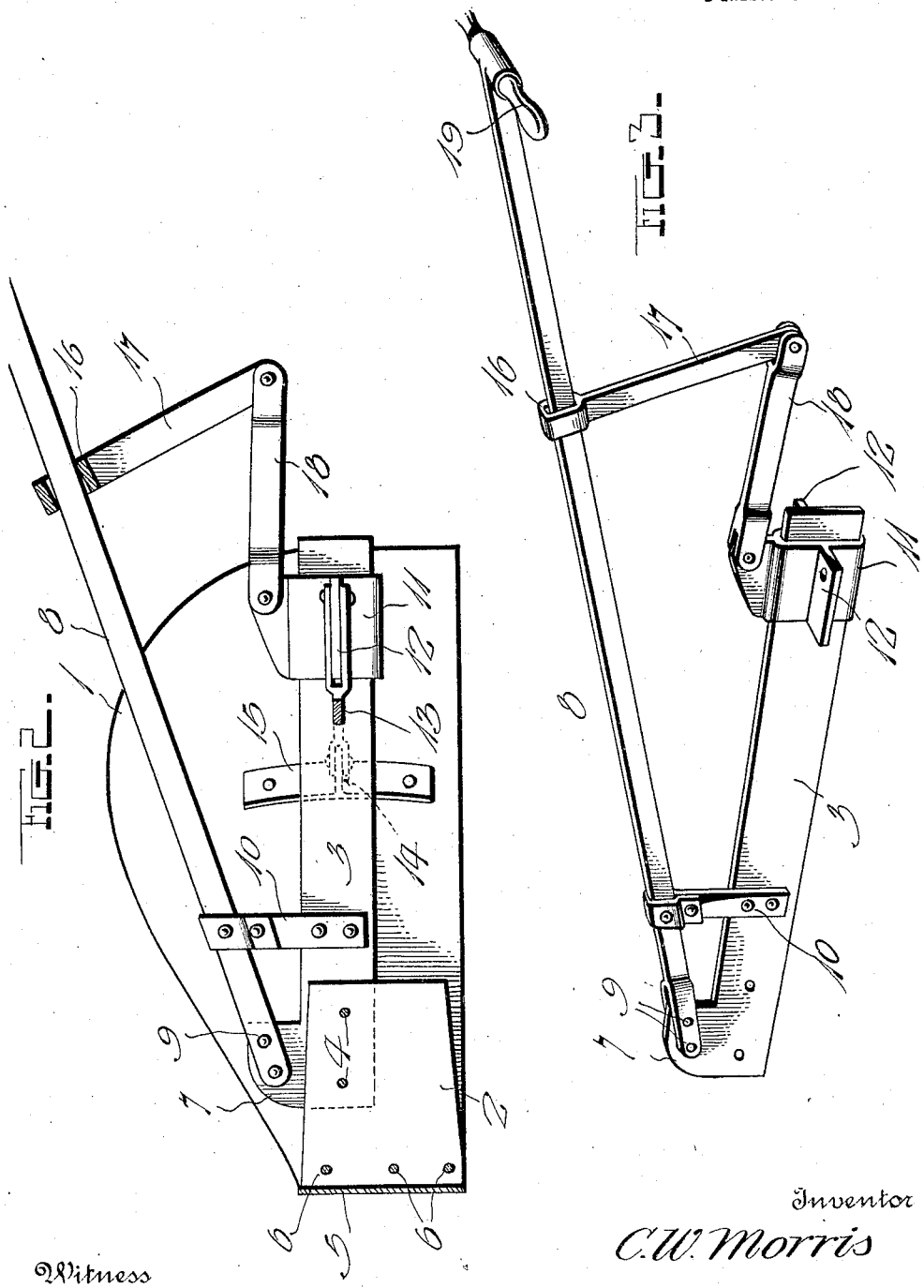

CHARLES W. MORRIS, OF TOLEDO, OHIO.

SNOW-PLOW.

1,307,410.  Specification of Letters Patent.  Patented June 24, 1919.

Application filed April 11, 1918. Serial No. 227,930.

*To all whom it may concern:*

Be it known that I, CHARLES W. MORRIS, a citizen of the United States, residing at Toledo, in the county of Lucas and State of Ohio, have invented certain new and useful Improvements in Snow-Plows; and I do declare the following to be a full, clear, and exact description of the invention, such as will enable others skilled in the art to which it appertains to make and use the same.

My invention has for its object to provide an extremely simple and inexpensive, yet a highly efficient and durable snow plow having novel means for adjusting its width, so that paths of any desired width may be cut through the snow.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a top plan of the improved snow plow;

Fig. 2 is a central longitudinal section;

Fig. 3 is a perspective view showing more particularly the handle for pushing the plow, the adjusting slide for varying the space between the two mold boards, and the means for holding said slide in adjusted position;

Fig. 4 is a detail transverse section on the plane of the line 4—4 of Fig. 1; and Fig. 5 is a transverse section through the entire plow on the plane indicated by the line 5—5 of Fig. 1.

In the drawings above briefly described, the numerals 1 designate a pair of suitably shaped mold boards formed of sheet metal and possessing considerable resiliency, the front ends of said mold boards being rigidly secured against the opposite sides of a center plate 2 which extends rearwardly between the mold boards and serves as attaching means for a central longitudinal bar 3, the two being rigidly secured together at 4. A substantially flat channel metal bar 5 preferably extends around the front ends of the mold boards 1 and the center plate 2, all of these parts being secured in fixed relation by rivets 6 passing therethrough. The front end of bar 3 as shown is provided with an upstanding lug 7 to which the front end of an upwardly and rearwardly inclined handle bar 8 is rigidly secured at 9, said bar being spaced in respect to the bar 3 by a vertical strap 10 or any other preferred means.

Slidable freely along the bar 3 is an adjusting slide 11 having lateral flanges 12 through which the inner ends of forwardly diverging toggle links 13 are pivoted, the front ends of said links being pivotally connected with ears 14 extending inwardly from vertical bars 15 which are riveted or otherwise secured to the inner sides of the mold boards 1, said bars serving not only as attaching means for the ears 14, but to stiffen the mold boards. When the slide 11 is forced forwardly along the bar 3, the toggle links 13 spread the mold boards 1 and since the front ends of these boards are rigidly connected, they must spring in order to move outwardly and they are thus placed under considerable tension which is exerting a rearward push on the slide 11. Rearward movement of this slide however is prevented by a canting slide 16 which is movable along the handle bar 8, said slide 16 having a depending arm 17 connected to the slide 11 by a longitudinal link 18 pivoted to both said arm and slide. The tendency of the slide 11 to move rearwardly, so rocks the arm 17 as to cant the slide 16 upon the handle bar 8, whereby said slide firmly grips said bar and thus prevents any movement of the means employed for holding the mold boards 10 in spread position.

The rear end of the bar 8 is provided with a transverse hand grip 19 and the plow is of such size as to permit operation thereof by hand, but I wish it understood that the device could well be manufactured in larger sizes and moved forwardly by draft animals or motor. On such larger sizes of the machine, the longitudinal bar 8 might well be located otherwise than in the manner shown and the hand grip 19 could be omitted if desired.

From the foregoing, taken in connection with the accompanying drawings, it will be obvious that although my invention is of extremely simple and inexpensive nature, it will be highly efficient for plowing paths of any required width. Since probably the best results are obtained from the several specific details shown and described, these details are preferably employed, but within the scope of the invention as claimed, numerous minor changes may well be made.

I claim:

1. A snow plow comprising a pair of rearwardly diverging mold boards, means for spreading said mold boards, and holding means for said spreading means including a canting slide and a fixed bar on which it is mounted, said slide gripping said bar when in one angular relation thereto and being slidable freely along the same when moved into another relative position.

2. A structure as specified in claim 1, said canting slide having a lateral arm by which the strain of holding said spreading means in operative position is received, whereby to cant said slide to gripping position.

3. A snow plow comprising a pair of rearwardly diverging mold boards, a bar extending longitudinally between said mold boards and secured rigidly in place, a slide movable along said bar, toggle links connecting said slide and mold boards, a second longitudinal bar spaced from said first named bar, a canting slide on said second bar having a laterally extending arm, and a link connecting said arm and said first named slide, whereby to normally cant the other slide to cause it to grip said second longitudinal bar.

4. A snow plow comprising a pair of rearwardly diverging mold boards, a longitudinal bar between said boards and rigidly secured at its front end thereto, an upwardly and rearwardly inclined bar secured at its front end to said first named bar, a slide on said first named bar, toggle links connecting said slide and said mold boards for spreading the latter when said slide is moved forwardly, a canting slide on said inclined bar having a depending arm, and a link extending forwardly from said arm and connected to said first named slide, whereby to normally cant the other slide and cause it to grip said inclined bar.

5. A snow plow comprising a pair of rearwardly diverging resilient mold boards rigidly joined at their front ends, means for spreading the rear ends of said mold boards and thus placing them under tension, and means held in operative position by such tension for holding said spreading means in operative position, said holding means comprising a canting slide and a bar on which it operates.

In testimony whereof I have hereunto set my hand in the presence of two subscribing witnesses.

CHARLES W. MORRIS.

Witnesses:
CLAUDE R. BANKER,
HILDA BOHNSACK.

Copies of this patent may be obtained for five cents each, by addressing the "Commissioner of Patents, Washington, D. C."